United States Patent Office 3,384,447
Patented May 21, 1968

3,384,447
METHOD OF PRODUCING MONOCRYSTALLINE BORACITES
Hans Schmid, 18 Rue des Caroubiers, Geneva, Switzerland
No Drawing. Filed Oct. 15, 1964, Ser. No. 404,189
Claims priority, application Switzerland, Oct. 19, 1963, 12,855/63
11 Claims. (Cl. 23—20)

ABSTRACT OF THE DISCLOSURE

Monocrystalline boracite having the general formula $Me_3B_7O_{13}Hal$, wherein Me is bivalent metal consisting of at least one bivalent metal element, and Hal is halogen consisting of at least one member of the halogen group, is produced through use of a method wherein halide of the metal Me and oxide of the metal Me, both in gaseous phase, and fluid phase boron oxide are reacted in a vessel, while oxide of the metal Me is transported to the reaction through a reversible equilibrium, and having a monocrystalline boracite thereby form upon a crystallization surface in the vessel.

---

This invention relates to a method of producing a monocrystalline boracite.

According to the present invention, there is provided a method of producing a monocrystalline boracite having the general formula $$Me_3B_7O_{13}Hal$$

wherein Me is an ion of at least one bivalent metal and Hal is an ion of at least one halogen, comprising the step of reacting in a vessel at a temperature of not less than 300° C. at least one halide of at least one bivalent metal, the oxide of this metal and boron oxide in the presence of a substance capable of transporting to the place of crystallization at least the metal oxide by forming a volatile compound with the metal thereof.

Depending on the halide used, brominated, chlorinated, iodinated or mixed halide boracites can be obtained. By way of bivalent metal, the following metals can for example be used: chromium, nickel, cobalt, iron, copper, cadmium, zinc, magnesium, manganese, platinum, calcium, titanium, vanadium, strontinum, zirconium, niobium, molybdenum, ruthenium, rhodium, palladium, tin, barium, hafnium, tantalum, tungsten, rhenium, osmium, iridium, mercury, and lead.

According to one version of the method, the three reactants, i.e. the halide, the boron oxide and the metal oxide are placed in a hermetically closed vessel, for example in a sealed ampoule, each in a crucible or boat, the three containers being separated from one another. The substance for "transporting" the oxides is also introduced into the ampoule before sealing the latter.

The $5MeO+MeHal_2+7B_2O_3=2Me_3B_7O_{13}Hal$ reaction is obtained by heating to a temperature greater than 300° C. Depending on the temperature and the quantity of the transporting substance, two types of reaction can be made to occur. The first consists in transporting the three reactants via the gas phase to the place of crystallization, i.e. on the walls of the vessel and/or of one of the crucibles. The second consists in transporting via the gas phase the halide and the metal oxide to the crucible containing the boron oxide, the latter being mainly transported by diffusion in the liquid state, the crystals then principally forming in this crucible.

As may be observed, in both types of reaction, it is necessary to transport via the gas phase the halide and the metal oxide and, in the first case also, the boron oxide.

Now, while the halides are volatile and can consequently transport themselves to the place of crystallization, this is not the case as regards the two oxides, i.e. the metal oxide and the boron oxide.

That is why it is necessary to carry out the reaction in the presence of a substance capable of transporting at least the metal oxide to the place of crystallization by forming a volatile compound with the metal of this oxide. This substance may be water, a compound giving off water, a hydrohalogenic acid, or a compound giving off a hydrohalogenic acid, by taking advantage of the reversible equilibrium.

$$H_2O(g)+MeHal_2(g)\rightleftharpoons 2HHal(g)+MeO$$

as regards a metal oxide, and of the following reversible equilibriums $$3B_2O_3(l)+6HHal(g)\rightleftharpoons 2(BOHal)_3(g)+3H_2O(g)$$

$$B_2O_3(l)+3H_2O(g)\rightleftharpoons 2H_3BO_3(g)$$

$$B_2O_3(l)+H_2O(g)\rightleftharpoons 2HBO_2(g)$$

$$3B_2O_3(l)+3H_2O(g)\rightleftharpoons 2(HBO_2)_3(g)$$

as regards the boron oxide, where (l) designates the liquid phase and (g) the gaseous phase.

Oxygen, a compound giving off oxygen, a halogen or a compound giving off a halogen can also be used by taking advantage of the reversible equilibrium $$O_2(g)+2MeHal_2(g)\rightleftharpoons 2Hal_2(g)+2MeO$$

as regards the metal oxide, and of the reversible equilibrium $$6B_2O_3(l)+6Hal_2(g)\rightleftharpoons 4(BOHal)_3(g)+3O_2$$

as regards the boron oxide.

It should be noted that instead of using a halide of a bivalent metal directly, a mixture of a bivalent metal and of a halogen or a mixture of a halide of a metal having a greater valence and of this bivalent metal can be used, the quantities of the constituent parts of each of these two mixtures being in a ratio such as to obtain $MeHal_2$.

The same applies to a bivalent metal oxide. Instead of using such an oxide directly, a mixture of this metal and of an oxide in which the valence thereof is greater than two can be used, the quantities of the two constituent parts of the mixture being in a ratio such as to obtain MeO.

The following examples show how the method may be carried out in accordance with the above-described version thereof.

Example 1

Three quartz crucibles having a height of about 3 cm. are superposed by means of quartz supports in a quartz ampoule having a length of about 15 cm. and a diameter of about 3 cm., the distance between two adjacent crucibles being of about 10 mm. The bottom crucible is charged with 1 gr. of chromium and 5 gr. of iodine, the middle crucible is charged with 2.8 gr. of boron oxide and the top crucible is charged with 1 gr. of chromic oxide ($Cr_2O_3$) and 0.35 gr. of chromium, whereupon the ampoule is closed while leaving a small opening which is connected to a vacuum pump. The ampoule is then heated, for example by means of a Bunsen burner, so as to rid the interior of all traces of water and air. Very dry nitrogen and 0.4 gr. of $H_3BO_3$ are then introduced into the ampoule whereupon the latter is evacuated at ambient temperature and hermetically closed. The ampoule is placed in a vertical tubular furnace which is progressively heated over a period of 2 hours to 900° C. This temperature is kept up for 2 days at the end of which the furnace is progressively cooled over a period of 6 hours to ambient temperature.

In the boron oxide crucible, outside the latter, and in some places of the ampoule wall are to be found green, iodinated chrome boracite monocrystals having cubic, tetrahedral and rhombododecahedral faces and having a size varying from some tenths of a millimeter to several millimeters. Some polycrystalline boracite crusts are also to be found as a by-product.

Example 2

The ampoule, the three superposed crucibles therein and the distance between the latter are identical to those in Example 1 except for the length of the ampoule which is 17 cm. The bottom crucible is charged with 2.6 gr. of nickel chloride, the middle crucible is charged with 2.8 gr. of boron oxide and the top crucible is charged with 1.5 gr. of nickel oxide. After having evacuated the ampoule by heating the latter to the point it begins to turn red, dry nitrogen and 0.25 gr. of $NiCl_2 \cdot 6H_2O$ are introduced therein whereupon the ampoule is again evacuated at ambient temperature. After having sealed the ampoule, the latter is placed in a tubular furnace and progressively heated over a period of 3 hours to 920° C. This temperature is kept up for 3 days whereupon it is progressively cooled over a period of 24 hours to ambient temperature.

In the boron oxide crucible and underneath that of the nickel oxide are to be found chlorinated nickel boracite monocrystals having a size ranging from some tenths of a millimeter to 12 millimeters. The faces of these crystals are mostly tetrahedral but cubic and rhombododecahedral faces are also to be found.

The removal of the crystals from the quartz walls can be carried out partly by boiling in water, since they are fixed thereto by a thin film of boric acid, and partly by sawing.

According to a second version of the method, the halide in its gaseous phase and water vapour or oxygen are introduced in a vessel containing the boron oxide in its liquid phase for as long as is necessary for the growth of the desired crystals to take place. The boron oxide is placed in a boat or a crucible which is heated to the required temperature. The water and halide vapours can be introduced into the vessel and transported to the place of crystallization each by means of a stream of inert gas, as for instance by means of a stream of nitrogen or helium. The halide can also be placed in the solid state in a heated boat which is itself placed in the vessel near the nitrogen stream inlet in order that the nitrogen stream may pass over the boat to transport the halide to the place of crystallization. Instead of solid halide, a mixture of iodine and of a bivalent metal or the latter only could be placed in the boat and a stream of halogen made to pass thereover. A bivalent metal oxide could also be placed in the boat and a stream of hydrohalogenic acid made to pass thereover which would not only give the halide but also water vapour.

The third reactant, i.e. the metal oxide, is obtained by hydrolysis of part of the halide when the latter and the water vapour are mixed at the place of crystallization.

The advantage of this version of the method resides in the possibility of regulating independently the vapour pressure of each of the gaseous reactants and hence of selecting an optimum pressure for each. Moreover, this pressure regulating possibility enables mixed monocrystals of desired composition with its constituents in desired ratios to be obtained, i.e. monocrystals having the formula $(Me_1, Me_2, \ldots Me_n)_3B_7O_{13}(Cl, Br, I)$ The following examples illustrate how this second version of the method may be carried out.

Example 3

A quartz tube having a length of 150 cm. and a diameter of 3 cm. is introduced into a horizontal tubular furnace about 120 cm. long and having two spaced heating zones of equal length. At each of its ends, the diameter of the tube is reduced by a few millimeters. A boat containing 50 gr. of $NiBr_2$ is placed in the tube portion located in the middle of one of the two heating zones and a boat containing 40 gr. of $B_2O_3$ is placed in the tube portion located in the middle of the other heating zone. The first zone containing the $NiBr_2$ is heated to 600° C., and the second zone containing the $B_2O_3$ is heated to 900° C. A stream of extra dry nitrogen is introduced through the $NiBr_2$ end of the tube and a stream of nitrogen containing water vapour having a partial pressure of 0.5 torr. is introduced through an opening of about 2 mm. in diameter formed in the tube wall between the two boats but near that containing the $B_2O_3$. The flow rate of each of the two nitrogen streams is 100 cm.$^3$/min. To prevent the diffusion of water from the $B_2O_3$ boat zone towards the $NiBr_2$ boat zone and hence hydrolysis of the $NiBr_2$, a nozzle having an opening of about 2 mm. in diameter is provided in the tube portion located between the two zones.

After about 24 hours, brominated nickel boracite monocrystals having cubic, tetrahedral and rhombododecahedral faces are to be found in the $B_2O_3$ boat and on the wall of the tube portion in which this boat is located. Polycrystalline crusts are also to be found there.

Example 4

The same installation is used as in Example 3. The boat located in the first heating zone is charged with 45 gr. of $CoBr_2$ and that located in the second heating zone is charged with 30 gr. of $B_2O_3$. The first zone is heated to 650° C. and the second zone is heated to 920° C. A stream of helium is introduced at the tube inlet and a stream of helium charged with water vapour having a partial pressure of 0.25 torr. is introduced through the opening located near the boat containing the $B_2O_3$. The rate of flow of each of the two streams is 150 cm.$^3$/min.

After about 30 hours, brominated cobalt boracite monocrystals having cubic, tetrahedral and rhombododecahedral faces are to be found in the $B_2O_3$ boat and on the wall of the tube portion surrounding this boat. Polycrystalline crusts are also to be found there.

I claim:

1. A method for producing monocrystalline boracite having the general formula $Me_3B_7O_{13}Hal$ wherein Me is bivalent metal consisting of at least one bivalent metal element, and Hal is halogen consisting of at least one member of the halogen group, said method comprising the step of reacting in fluid state reaction within a vessel, at a temperature greater than 300° C., gaseous phase halide of said metal Me and fluid phase boron oxide with gaseous phase oxide of said metal Me, by placing in separate containers in said vessel boron oxide, the halide and the oxide of said metal, heating said vessel to said temperature in the presence of a substance capable of transporting at least the metal oxide to a crystallization surface by forming a volatile compound therewith, said substance being selected from the group consisting of water vapor, compounds yielding water vapor, a vaporous hydrohalogenic acid, compounds yielding a vaporous hydrohalogenic acid, oxygen, compounds yielding oxygen, a halogen and compounds yielding a halogen and recovering said boracite as product of said reaction.

2. A method according to claim 1, wherein said reaction is carried out in a hermetically closed vessel having therein a source of boron oxide for said reaction, a source of oxide of said metal Me for said reaction, and a source of halide of said metal Me for said reaction.

3. A method according to claim 2, wherein said sources of oxide and halide of said metal Me are contained at upper and lower levels and said source of boron oxide is contained disposed intermediate said upper and lower levels.

4. A method according to claim 1, wherein gaseous phase halide of said metal Me and oxygen are introduced to liquid phase boron oxide in said vessel for sustaining said reaction.

5. A method according to claim 1, wherein gaseous phase halide of said metal Me and water vapor are introduced to liquid phase boron oxide in said vessel for sustaining said reaction.

6. A method according to claim 1, wherein gaseous phase halide of said metal Me and water vapor are introduced by means of an inert gas to liquid phase boron oxide in said vessel for sustaining said reaction.

7. A method according to claim 1, wherein said halide and oxide of said metal Me are the halide and oxide of at least one metal selected from the group consisting of chromium, nickel, cobalt, iron, copper, cadmium, zinc, magnesium, manganese, platinum, calcium, titanium, vanadium, strontium, zirconium, niobium, molybdenum, ruthenium, rhodium, palladium, tin, barium, hafnium, tantalum, tungsten, rhenium, osmium, iridium, mercury, and lead.

8. A method according to claim 1, wherein halide of said metal Me for said reaction to be sustained is obtained from said metal Me in mixture with halogen, while said mixture is placed inside said vessel.

9. A method according to claim 1, wherein halide of said metal Me for said reaction to be sustained is obtained from said metal Me in mixture with halide of a metal having a valence greater than two, while said mixture is placed inside said vessel.

10. A method according to claim 5, wherein gaseous phase halide of said metal Me and water vapor are obtained from bivalent metal oxide and hydrohalogenic acid reacting within said vessel.

11. A method according to claim 2, wherein oxide of bivalent metal for said reaction to be sustained is obtained from a mixture of bivalent metal and oxide of metal having a valence greater than two, while said mixture is placed inside said vessel.

References Cited

Deiss et al.: "Comptes Rendus," vol. 244, 1957, pages 464–467.

Jona: "Journal of Physical Chemistry," vol., 63, 1959, pages 1750–1752.

Kuhn: "Chemical Abstracts," vol. 52, 1958, page 3599e.

Nitsche et al.: "Journal of the Physics and Chemistry of Solids," vol. 21, 1961, pages 199–205.

Mellor: "A Comprehensive Treatise On Inorganic and Theoretical Chemistry," vol. 5, Longmans, Green and Co., New York, 1924, pages 137–141.

OSCAR R. VERTIZ, *Primary Examiner.*

H. T. CARTER, *Assistant Examiner.*